(12) United States Patent
Liu et al.

(10) Patent No.: US 11,626,646 B2
(45) Date of Patent: Apr. 11, 2023

(54) DAMPENING LAYERS DISPOSED WITHIN BATTERY CELL

(71) Applicant: Apple Inc., Cupertino, CA (US)

(72) Inventors: Zuqin Liu, Sunnyvale, CA (US); Shabab Amiruddin, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 17/172,899

(22) Filed: Feb. 10, 2021

(65) Prior Publication Data
US 2022/0094005 A1 Mar. 24, 2022

Related U.S. Application Data

(60) Provisional application No. 63/082,572, filed on Sep. 24, 2020.

(51) Int. Cl.
*H01M 50/242* (2021.01)
(52) U.S. Cl.
CPC ................. *H01M 50/242* (2021.01)
(58) Field of Classification Search
CPC .................................................. H01M 50/242
See application file for complete search history.

(56) References Cited

U.S. PATENT DOCUMENTS

| | | | |
|---|---|---|---|
| 9,287,536 B2 | 3/2016 | Waters | |
| 2012/0225331 A1 | 9/2012 | Tartaglia | |
| 2013/0164575 A1* | 6/2013 | Kim | H01M 4/84 29/6.1 |
| 2016/0322618 A1* | 11/2016 | Jeong | H01M 50/451 |

OTHER PUBLICATIONS

"New study provides overview of challenges, requirement for large-scale production of all-solid-state Li-ion and Li-metal batteries," Feb. 26, 2018, https://www.greencarcongress.com/2018/02/20180226-assb.html, accessed Jul. 10, 2020, 14 pages.
Ladpli et al., "Multifunctional Energy Storage Composites for SHM Distributed Sensor Networks," Conference Paper, 10th International Workshop on Structural Health Monitoring (IWSHM 2015), Sep. 2015, 11 pages.

* cited by examiner

*Primary Examiner* — Jane J Rhee
(74) *Attorney, Agent, or Firm* — BakerHostetler

(57) ABSTRACT

The disclosed technology relates to a battery utilizing a dampening layer to prevent a failure of the battery. The battery includes an enclosure, a set of electrodes enclosed within the enclosure, and a dampening layer disposed within the set of electrodes. The dampening layer partitions the set of electrodes into a first subset of electrodes and a second subset of electrodes. The dampening layer is configured to absorb a mechanical impact on the enclosure to prevent a failure of at least one of the first subset of electrodes and the second subset of electrodes. The dampening layer may be formed at least one of a polymer, metal, and ceramic.

18 Claims, 4 Drawing Sheets

DAMPENING LAYERS DISPOSED WITHIN BATTERY CELL

PRIORITY

This application claims the benefit under 35 U.S.C. § 119(e) of U.S. Provisional Patent Application Ser. No. 63/082,572, entitled "DAMPENING LAYERS DISPOSED WITHIN BATTERY CELL," filed on Sep. 24, 2020, which is incorporated herein by reference in its entirety.

TECHNICAL FIELD

The present disclosure relates generally to battery cells, and more particularly, to battery cells utilizing a dampening layer to absorb a mechanical impact and prevent a failure.

BACKGROUND

Battery cells are used to provide power to a wide variety of portable electronic devices, including laptop computers, tablet computers, mobile phones, personal digital assistants (PDAs), digital music players, watches, and wearable devices. A commonly used type of battery is a lithium battery, which can include a lithium-ion or a lithium-polymer battery.

Lithium batteries often include cells that are made of an anode layer and a cathode layer, with a separator disposed there-between. The layers may stacked or wound, and may be housed within a pouch or an enclosure. A first conductive tab may be coupled to the cathode layer and a second conductive tab may be coupled to the anode layer. The first and second conductive tabs may extend through the pouch or enclosure to provide terminals for the battery cell.

SUMMARY

The disclosed embodiments provide for a battery that utilizes a dampening layer to absorb a mechanical impact on an enclosure to prevent a failure of the battery. The battery includes an enclosure; a set of electrodes enclosed within the enclosure; and a dampening layer disposed within the set of electrodes. The dampening layer partitions the set of electrodes into a first subset of electrodes and a second subset of electrodes. The dampening layer is configured to absorb a mechanical impact on the enclosure to prevent a failure of at least one of the first subset of electrodes and the second subset of electrodes.

In some embodiments, a portable electronic device utilizing a battery with a dampening layer to absorb a mechanical impact on an enclosure to prevent a failure of the battery, is disclosed. The portable electronic device includes a set of components powered by a battery. The battery includes an enclosure, a set of electrodes enclosed within the enclosure, and a dampening layer disposed within the set of electrodes. The dampening layer partitions the set of electrodes into a first subset of electrodes and a second subset of electrodes. The dampening layer is configured to absorb a mechanical impact on the enclosure to prevent a failure of at least one of the first subset of electrodes and the second subset of electrodes.

In some embodiments, a method for preventing a thermal runaway of a battery is disclosed. The method includes inserting a set of electrodes in an enclosure; and disposing a first dampening layer within the set of electrodes to partition the set of electrodes into a first subset of electrodes and a second subset of electrodes. The method further includes preventing a thermal runaway of the set of electrodes by absorbing a mechanical impact on the enclosure by preventing a failure of at least one of the first subset of electrodes and the second subset of electrodes. The first dampening layer may be formed of at least one of a polymer, metal, and ceramic.

The disclosed embodiments provide for a battery that utilizes a first dampening layer and a second dampening layer to absorb a mechanical impact on an enclosure to prevent a failure of the battery. The battery includes an enclosure; a set of electrodes enclosed within the enclosure; a first dampening layer disposed between a first outer surface of the set of electrodes and the enclosure; and a second dampening layer disposed between a second outer surface of the set of electrodes and the enclosure. The first and second dampening layers are disposed on opposite ends of the set of electrodes. The first and second dampening layers are also configured to absorb a mechanical impact on the enclosure to prevent a failure the set of electrodes.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Batteries may fail when subjected to a mechanical impact that results in electrical shorting of internal components. Shorting may further cause a thermal runaway. Specifically, when subjected to a mechanical impact, a set of electrodes enclosed within an enclosure may compress and rupture or fracture at or near a point of contact. The failed electrodes may short with other electrodes, leading to an increased risk of a thermal runaway.

The disclosed technology addresses the need for preventing such failure by utilizing a dampening layer to absorb a mechanical impact to thereby prevent a failure of the electrodes. The dampening layer may be disposed within the electrodes to thereby partition the electrodes into a first subset of electrodes and a second subset of electrodes. By partitioning the electrodes into subsets, a thermal runaway threshold capacity of the electrodes is divided, further improving the safety of the battery.

Figure 1:
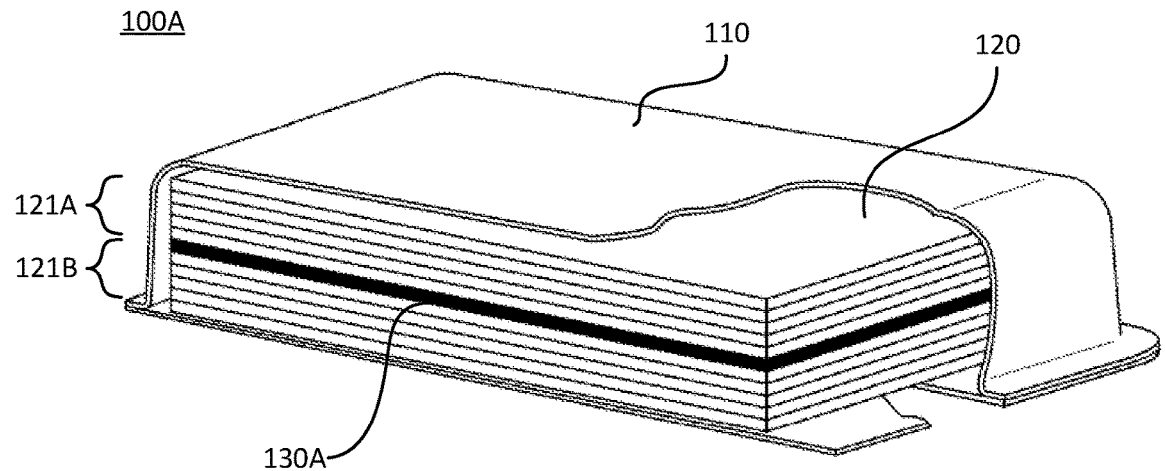
FIG. 1 illustrates a perspective cut-away view of a battery utilizing a first dampening layer, in accordance with various embodiments of the subject technology.

FIG. 1 illustrates a perspective cut-away view of a battery 100A utilizing a first dampening layer 130A, in accordance with various embodiments of the subject technology. The battery 100A comprises an enclosure 110, a set of electrodes 120 enclosed within the enclosure 110, and a first dampener layer 130A.

The enclosure 110 may comprise a can, pouch, or other type of enclosure as would be known by a person of ordinary skill. The set of electrodes 120 may comprise a plurality of cathode layers and anode layers, with separators disposed between each of the cathode layers and the anode layers, as discussed further below with reference to FIG. 5. The set of electrodes 120 may be packaged or wound within the enclosure 110. A first conductive tab may be electrically coupled to the plurality of cathode layers and a second conductive tab may be electrically coupled to the plurality of anode layers. The first and second conductive tabs may extend through the enclosure 110 to provide a first terminal and a second terminal for the set of electrodes 120 enclosed within the enclosure 110.

The first dampening layer 130A is disposed within the set of electrodes 120. As shown in FIG. 1, the first dampening layer 130A partitions the set of electrodes 120 into a first subset of electrodes 121A and a second subset of electrodes 121B. The first dampening layer 130A is configured to absorb a mechanical impact on the enclosure 110 to prevent a failure of at least one of the first subset of electrodes 121A and the second subset of electrodes 121B. The first dampening layer 130A may be formed of a single layer, or multiple layers, formed of a non-conductive material, such as a polymer, ceramic or combination thereof. The first dampening layer 130A is further configured to absorb a mechanical impact of at least 70 MPa. For example, the first dampening layer 130A may be formed of a foam or honeycomb structure that is configured to deflect and thereby absorb a mechanical impact. The first dampening layer 130A may have a thickness of 1-100 µm, a thickness of 5-50 µm, or a thickness of 10-25 µm.

In one aspect, the first dampening layer 130A divides a thermal runaway threshold capacity of the set of electrodes 120. For example, if the set of electrodes 120 has a thermal runaway threshold capacity of $E_0$, the first subset of electrodes 121A may have a thermal runaway threshold capacity of $E_0/2$ and the second subset of electrodes 121B may have a thermal runaway threshold capacity of $E_0/2$. In this example, should the first subset of electrodes 121A be subjected to a mechanical impact that results in a failure of the first subset of electrodes 121A, the first dampening layer 130A prevents the mechanical impact of damaging the second subset of electrodes 121B and further, limits any shorting that may occur in the first subset of electrodes 121A to a thermal runaway threshold capacity of $E_0/2$, which is significantly less than the thermal runaway threshold capacity $E_0$ of the entire set of electrodes 120. As such, the first dampening layer 130A prevents a thermal runaway of the entire set of electrodes 120 by absorbing the mechanical impact on the enclosure 110.

Figure 2:
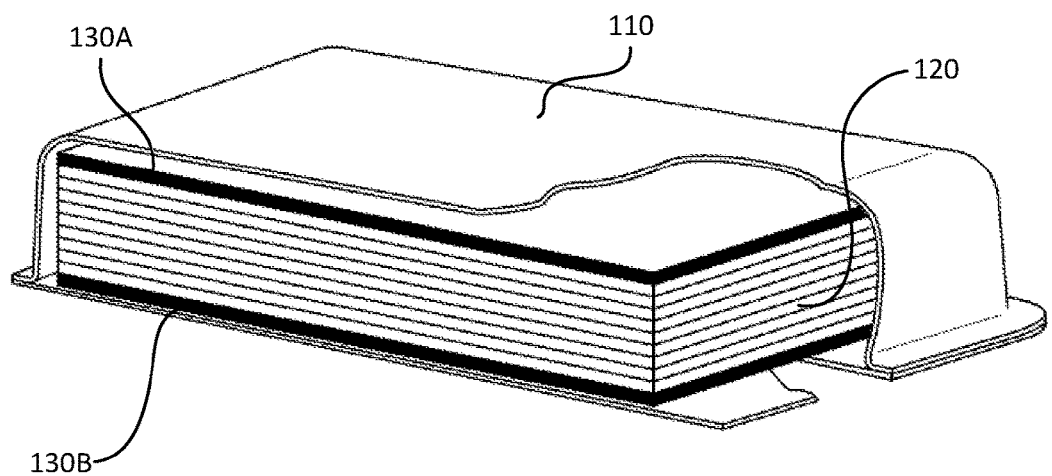
FIG. 2 illustrates a perspective cut-away view of a battery utilizing a first and second dampening layer, in accordance with various embodiments of the subject technology.

FIG. 2 illustrates a perspective cut-away view of a battery 100B utilizing a first and second dampening layer, 130A and 130B respectively, in accordance with various embodiments of the subject technology. The battery 100B includes the enclosure 110, the set of electrodes 120 enclosed within the enclosure 110, a first dampening layer 130A disposed between a first outer surface of the set of electrodes 120 and the enclosure 110, and a second dampening layer 130B disposed between a second outer surface of the set of electrodes 120 and the enclosure 110. As shown in FIG. 2, the first and second dampening layers, 130A and 130B respectively, are disposed on opposite ends of the set of electrodes 120. As discussed above, the first and second dampening layers, 130A and 130B respectively, are configured to absorb a mechanical impact on the enclosure 110 to prevent a failure the set of electrodes 120.

Figure 3:
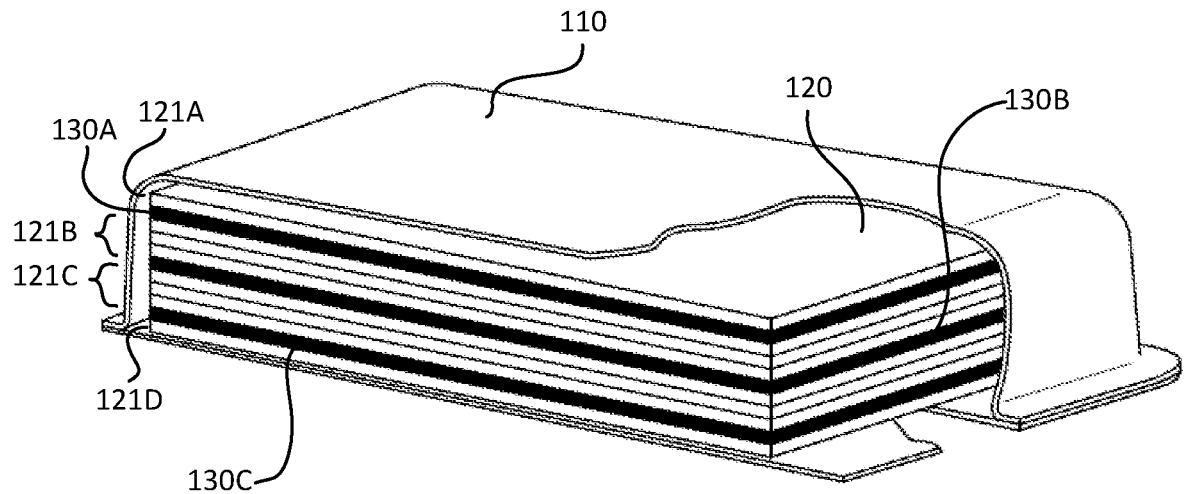
FIG. 3 illustrates a perspective cut-away view of a battery utilizing a first, second and third dampening layer, in accordance with various embodiments of the subject technology.

FIG. 3 illustrates a perspective cut-away view of a battery 100C utilizing a first, second and third dampening layer 130A-C, in accordance with various embodiments of the subject technology. The battery 100C includes the enclosure 110, the set of electrodes 120 enclosed within the enclosure 110, and the first, second and third dampening layers 130A-C. As shown in FIG. 3, the first, second and third dampening layers 130A-C are disposed within the set of electrodes 120 to partition the set of electrodes 120 into a first subset of electrodes 121A, a second subset of electrodes 121B, a third subset of electrodes 121C, and a fourth subset of electrodes 121D.

Figure 4:
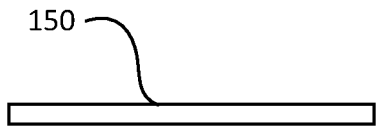
FIG. 4 illustrates a partial cross-section view of dampening layers, in accordance with various embodiments of the subject technology.
Figure 4:
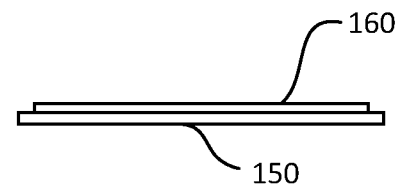

FIG. 4 illustrates a partial cross-section view of dampening layers 130A-C, in accordance with various embodiments of the subject technology. As described above, the dampening layer 130A-C may comprise a single layer, or multiple layers, formed of a non-conductive material 150, such as a polymer, ceramic or combination thereof. In other aspects, where the dampening layer 130A-B may be disposed adjacent to the enclosure (as shown in FIG. 2), the dampening layer 130A-B may be configured to provide an immediate pathway for shorting the set of electrodes in the event of a mechanical abusive load. By providing an immediate pathway for shorting the set of electrodes or battery cell, the short allows draining of the energy stored in the battery cell at the contact point between the dampening layer 130A-B and the enclosure instead of elsewhere in the battery, thereby avoiding instances where a short may result in current flowing through flammable active material which may lead to thermal runaway and fire.

Specifically, the dampening layer 130A-B may comprise a layer of copper 160 disposed on a non-conductive layer 150. The dampening layer 130A-B is arranged within the enclosure so that the layer of copper 160 faces an inner surface of the enclosure 110. Upon an abusive mechanical impact, the non-conductive material 150 may be ruptured to thereby cause the layer of copper 160 to contact an underlying electrode to create a short between the enclosure and the underlying electrode to thereby drain the battery cell.

Figure 5:
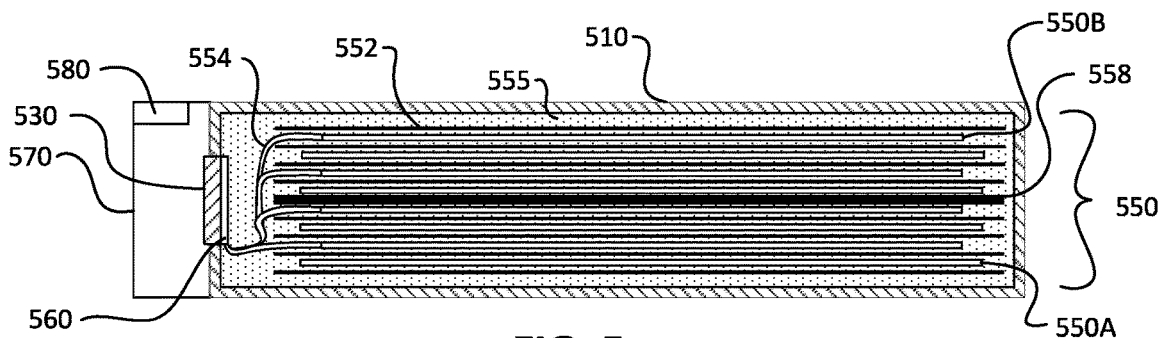
FIG. 5 illustrates a cross-section view of a battery, in accordance with various embodiments of the subject technology.

FIG. 5 illustrates a cross-section view of a battery 500, in accordance with various embodiments of the subject technology. The battery 500 includes a battery cell 550, an enclosure 510, and a management circuit module 570. The management circuit module 570 is configured to manage and monitor the battery cell 550.

The battery cell 550 includes a set of electrodes comprising a cathode 550A, a separator 552, and an anode 550B. The set of electrodes of the battery cell 550 may be wound to form a jelly roll structure or can be stacked to form a stacked-cell structure. The set of electrodes are enclosed within the enclosure 510 and maybe immersed in an electrolyte 555. The electrolyte can additionally be in the form of a solution, a gel, or a solid. Disposed within the set of electrodes of the battery cell 550 is at least one dampener layer 558, as discussed above.

Extending from the set of electrodes of the battery cell 550 are tabs 554. The tabs 554 may be interconnected to a single tab 560 that is connected to a feedthrough 530. The battery 500 also includes terminals 580 that are configured to connect to external components to provide power to such components.

Figure 6:
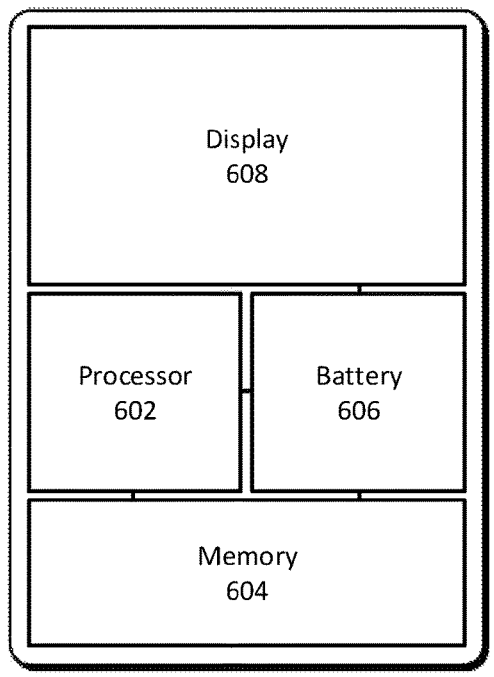
FIG. 6 illustrates a portable electronic device, in accordance with various embodiments of the subject technology.

FIG. 6 illustrates a portable electronic device 600, in accordance with various embodiments of the subject technology. The above-described battery 100A-C can generally be used in any type of electronic device. For example, FIG. 6 illustrates a portable electronic device 600 which includes a processor 602, a memory 604 and a display 608, which are all powered by the battery 606. Portable electronic device 600 may correspond to a laptop computer, tablet computer, mobile phone, personal digital assistant (PDA), digital music player, watch, and wearable device, and/or other type of battery-powered electronic device. Battery 606 may correspond to a battery pack that includes one or more battery cells. The battery 606 utilizes one or more dampening layers 130A-C as described above.

Figure 7:
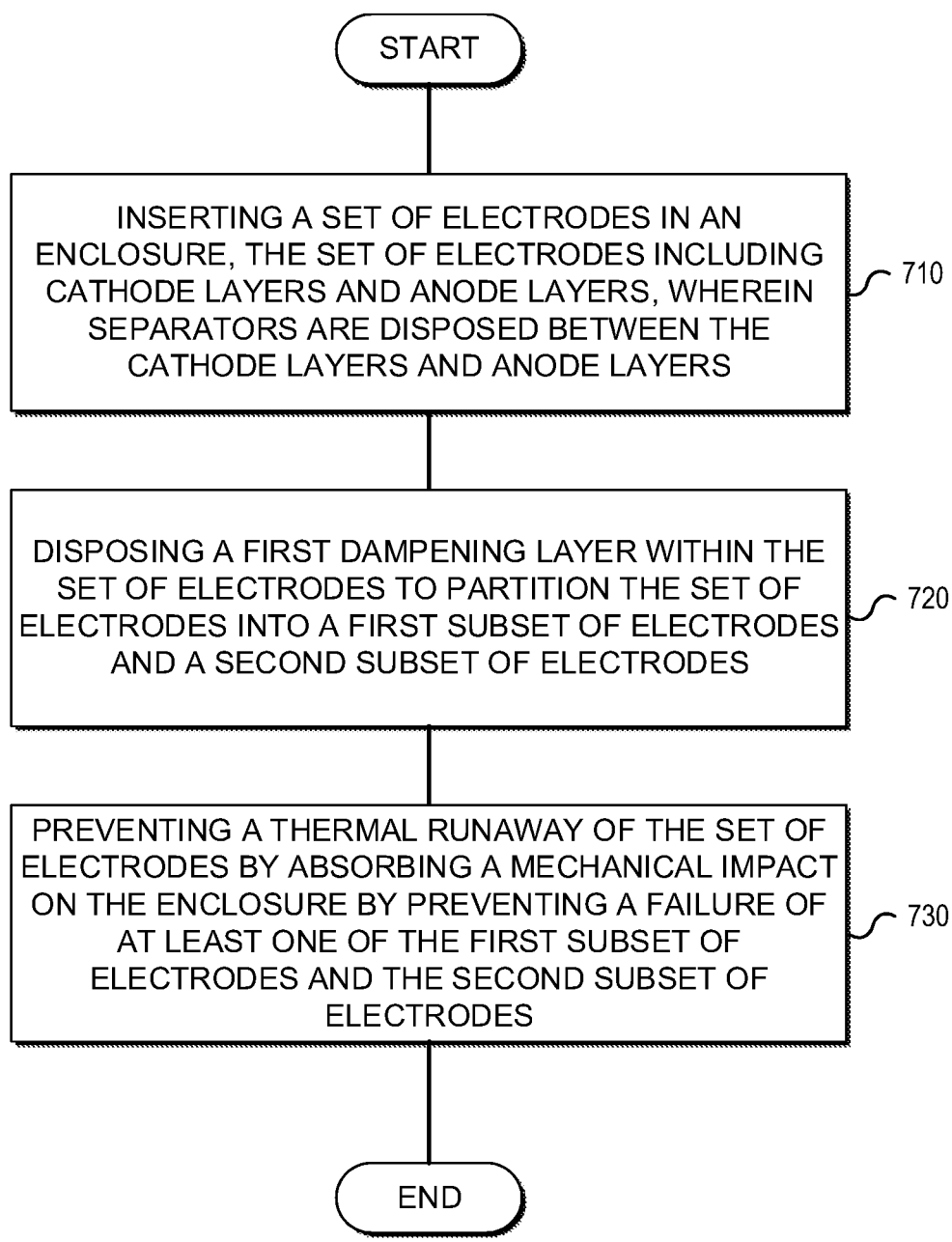
FIG. 7 illustrates an example method for preventing a thermal runaway of a battery, in accordance with various embodiments of the subject technology.

FIG. 7 illustrates an example method 700 for preventing a thermal runaway of a battery, in accordance with various embodiments of the subject technology. It should be understood that, for any process discussed herein, there can be additional, fewer, or alternative steps performed in similar or alternative orders, or in parallel, within the scope of the various embodiments unless otherwise stated.

At operation 710, a set of electrodes are inserted in an enclosure. The set of electrodes include cathode layers, anode layers, and separator layers disposed between each of the cathode layers and the anode layers. The enclosure may comprise a can, pouch, or other type of enclosure as would be known by a person of ordinary skill. At operation 720, a dampening layer is disposed within the set of electrodes to partition the set of electrodes into a first subset of electrodes and a second subset of electrodes.

At operation 730, a thermal runaway of the set of electrodes is prevented by absorbing a mechanical impact on the enclosure to thereby prevent a failure of at least one of the first subset of electrodes and the second subset of electrodes. The dampening layer comprises at least one of a polymer, metal, and ceramic. The method 700 may also include dividing a thermal runaway threshold capacity of the set of electrodes by disposing the dampener layer within the set of electrodes.

The method 700 may also include disposing a second dampening layer within the set of enclosures, and partitioning the set of electrodes into the first subset of electrodes, the second subset of electrodes, and a third subset of electrodes.

The method 700 may also include disposing a third dampening layer within the set of electrodes, and partitioning the set of electrodes into the first subset of electrodes, the second subset of electrodes, the third subset of electrodes, and a fourth subset of electrodes.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A battery, comprising:
    an enclosure;
    a set of electrodes enclosed within the enclosure, the set of electrodes including cathode layers and anode layers, wherein separators are disposed between the cathode layers and anode layers; and
    a first dampening layer disposed within the set of electrodes, the first dampening layer partitioning the set of electrodes into a first subset of electrodes and a second subset of electrodes;
        wherein the first dampening layer is configured to absorb a mechanical impact on the enclosure to prevent a failure of at least one of the first subset of electrodes and the second subset of electrodes, wherein the mechanical impact comprises at least 70 MPa; and
        wherein the first dampening layer comprises at least one of a polymer, metal, and ceramic.

2. The battery of claim 1, wherein the first dampening layer has a thickness of 1-100 μm.

3. The battery of claim 1, wherein the first dampening layer divides a thermal runaway threshold capacity of the set of electrodes.

4. The battery of claim 1, wherein the first dampening layer is configured to prevent a thermal runaway of the set of electrodes by absorbing the mechanical impact on the enclosure.

5. The battery of claim 1, further comprising a second dampening layer, wherein the first and second dampening layers are disposed within the set of electrodes to partition the set of electrodes into the first subset of electrodes, the second subset of electrodes, and a third subset of electrodes.

6. The battery of claim 5, further comprising a third dampening layer, wherein the first, second and third dampening layers are disposed within the set of electrodes to partition the set of electrodes into the first subset of electrodes, the second subset of electrodes, the third subset of electrodes, and a fourth subset of electrodes.

7. A portable electronic device, comprising:
    a set of components powered by a battery;
    the battery comprising:
    an enclosure;
    a set of electrodes enclosed within the enclosure, the set of electrodes including cathode layers and anode layers, wherein separators are disposed between the cathode layers and anode layers; and
    a first dampening layer disposed within the set of electrodes, the first dampening layer partitioning the set of electrodes into a first subset of electrodes and a second subset of electrodes;
        wherein the first dampening layer is configured to absorb a mechanical impact on the enclosure to prevent a failure of at least one of the first subset of electrodes and the second subset of electrodes, wherein the mechanical impact comprises at least 70 MPa; and wherein the first dampening layer comprises at least one of a polymer, metal, and ceramic.

8. The portable electronic device of claim 7, wherein the first dampening layer has a thickness of 1-100 μm.

9. The portable electronic device of claim 7, wherein the first dampening layer divides a thermal runaway threshold capacity of the set of electrodes.

10. The portable electronic device of claim 7, wherein the first dampening layer is configured to prevent a thermal runaway of the set of electrodes by absorbing the mechanical impact on the enclosure.

11. The portable electronic device of claim 7, further comprising a second dampening layer, wherein the first and second dampening layers are disposed within the set of electrodes to partition the set of electrodes into the first subset of electrodes, the second subset of electrodes, and a third subset of electrodes.

12. The portable electronic device of claim 11, further comprising a third dampening layer, wherein the first, second and third dampening layers are disposed within the set of electrodes to partition the set of electrodes into the first subset of electrodes, the second subset of electrodes, the third subset of electrodes, and a fourth subset of electrodes.

13. A method for preventing a thermal runaway of a battery, the method comprising:
   inserting a set of electrodes in an enclosure, the set of electrodes including cathode layers and anode layers, wherein separators are disposed between the cathode layers and anode layers;
   disposing a first dampening layer within the set of electrodes to partition the set of electrodes into a first subset of electrodes and a second subset of electrodes; and
   preventing a thermal runaway of the set of electrodes by absorbing a mechanical impact on the enclosure by preventing a failure of at least one of the first subset of electrodes and the second subset of electrodes, wherein the first dampening layer comprises at least one of a polymer, metal, and ceramic, and wherein the mechanical impact comprises at least 70 MPa.

14. The method of claim 13, further comprising dividing a thermal runaway threshold capacity of the set of electrodes by disposing the first dampening layer within the set of electrodes.

15. The method of claim 13, further comprising:
   disposing a second dampening layer within the set of enclosures; and
   partitioning the set of electrodes into the first subset of electrodes, the second subset of electrodes, and a third subset of electrodes.

16. The method of claim 15, further comprising:
   disposing a third dampening layer within the set of electrodes; and
   partitioning the set of electrodes into the first subset of electrodes, the second subset of electrodes, the third subset of electrodes, and a fourth subset of electrodes.

17. A battery, comprising:
   an enclosure;
   a set of electrodes enclosed within the enclosure, the set of electrodes including cathode layers and anode layers, wherein separators are disposed between the cathode layers and anode layers;
   a first dampening layer disposed between a first outer surface of the set of electrodes and the enclosure; and
   a second dampening layer disposed between a second outer surface of the set of electrodes and the enclosure, wherein the first and second dampening layers are disposed on opposite ends of the set of electrodes;
   wherein the first and second dampening layers are configured to absorb a mechanical impact on the enclosure to prevent a failure the set of electrodes, wherein the mechanical impact comprises at least 70 MPa; and
   wherein the first and second dampening layers comprise at least one of a polymer, metal, and ceramic.

18. The battery of claim 17, wherein the first and second dampening layers comprise a layer of copper facing an inner surface of the enclosure, wherein the layer of copper is configured to create a short between the enclosure and the set of electrodes in the event of failure of the set of electrodes due to a mechanical impact on the enclosure.

* * * * *